US010288642B2

(12) United States Patent
Kim et al.

(10) Patent No.: US 10,288,642 B2
(45) Date of Patent: May 14, 2019

(54) PHYSICAL QUANTITY MEASURING APPARATUS AND SIGNAL PROCESSING METHOD THEREOF

(71) Applicant: Haechitech Corporation, Cheongwon-gu, Chungcheongbuk-do (KR)

(72) Inventors: Dong Ho Kim, Cheongju-si (KR); Sang Kyung Kim, Daejeon (KR)

(73) Assignee: Haechitech Corporation, Cheongju-si (KR)

( * ) Notice: Subject to any disclaimer, the term of this patent is extended or adjusted under 35 U.S.C. 154(b) by 395 days.

(21) Appl. No.: 15/064,837

(22) Filed: Mar. 9, 2016

(65) Prior Publication Data
US 2016/0349285 A1 Dec. 1, 2016

(30) Foreign Application Priority Data

May 27, 2015 (KR) .................. 10-2015-0073569

(51) Int. Cl.
*G06D 1/00* (2006.01)
*G01P 15/105* (2006.01)
*G01P 15/18* (2013.01)

(52) U.S. Cl.
CPC ............ *G01P 15/105* (2013.01); *G01P 15/18* (2013.01)

(58) Field of Classification Search
CPC ................................ G01P 15/105; G01P 15/18
USPC ........................................................ 702/127
See application file for complete search history.

(56) References Cited

U.S. PATENT DOCUMENTS

| 4,986,121 A * | 1/1991 | Luscombe | G01C 21/16 |
| | | | 73/170.29 |
| 2009/0271142 A1 | 10/2009 | Yamashita et al. | |
| 2013/0314079 A1* | 11/2013 | Suzuki | G01D 5/145 |
| | | | 324/207.25 |
| 2014/0136048 A1* | 5/2014 | Ummethala | G01P 21/00 |
| | | | 701/33.1 |

FOREIGN PATENT DOCUMENTS

JP 2014-6059 A 1/2014
KR 10-2009-0045330 A 5/2009

OTHER PUBLICATIONS

Korean Office Action dated Nov. 29, 2016 in Korean Patent Application No. 10-2015-0073569. (Six pages, in Korean).

* cited by examiner

Primary Examiner — Toan M Le
Assistant Examiner — Xiuquin Sun
(74) Attorney, Agent, or Firm — NSIP Law

(57) ABSTRACT

According to one embodiment, a physical quantity measuring apparatus includes a signal measurer configured to include sensors configured to measure component values of two axes from among component values of three axes including an X(Hx), a Y(Hy) and a Z(Hz) measured component value of a physical quantity to be measured, a sensor controller configured to select one from among the sensors to be controlled to output a measured value from the selected sensor, an A/D transformer configured to transform an outputted signal selected by the sensor control unit into a digital signal, and a signal processor configured to receive the digital signal from the A/D transformer and to combine the received digital signal with other received digital signals to calculate X, Y and Z component values of the physical quantity.

20 Claims, 8 Drawing Sheets

PHYSICAL QUANTITY MEASURING APPARATUS AND SIGNAL PROCESSING METHOD THEREOF

CROSS-REFERENCE TO RELATED APPLICATION(S)

This application claims the benefit under 35 USC 119(a) of Korean Patent Application No. 10-2015-0073569 filed on May 27, 2015 in the Korean Intellectual Property Office, the entire disclosure of which is incorporated herein by reference for all purposes.

BACKGROUND

1. Field

The following description relates to a physical quantity measuring apparatus and signal processing method thereof. More particularly, the following description discloses a measuring technique of a magnetic field and an acceleration. The following description also relates to extracting three magnetic field components X, Y and Z of the magnetic field using a physical quantity measuring apparatus and a corresponding acceleration.

2. Description of Related Art

Recently, a demand for an apparatus that provides a function of measuring a physical quantity such as a magnetic field or acceleration is increasing. A physical quantity measuring apparatus may be made in a small size and may be made able to measure quickly and accurately the magnetic field or the acceleration. That is, the physical quantity measuring apparatus benefits from an efficient and accurate measuring technique in combination with a fixed hardware and time. The most demand for accurate measuring is improving a Signal to Noise Ratio (SNR) of a measuring apparatus. For example, the SNR of the measuring apparatus may improve through a decrease of a noise component. The decreasing degree of a noise component may be changed according to a calculation method of a sensing signal received from a sensor.

Many efforts have been spent investigating to improve the SNR in the physical quantity measuring apparatus, especially for measuring the magnetic field and acceleration. However, reference technology has a problem that has still a small SNR and requires large current source.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a physical quantity measuring apparatus includes a signal measurer including sensors configured to measure component values of two axes from among component values of three axes including an X (Hx), a Y (Hy), and a Z (Hz) measured component value of a physical quantity to be measured, a sensor controller configured to select one from among the sensors to be controlled to output a measured value from the selected sensor, an A/D transformer configured to transform an outputted signal selected by the sensor control unit into a digital signal, and a signal processor configured to receive the digital signal from the A/D transformer and to combine the received digital signal with other received digital signals to calculate X, Y and Z component values of the physical quantity.

The physical quantity measuring apparatus may further include an amplifier configured to amplify the outputted signal selected by the sensor controller, wherein each physical quantity outputted by the amplifier includes only components for two axes.

The sensors may include a first sensor configured to measure the Hx and the Hz component values to output a sum (Hx+Hz) of the Hx component value and the Hz component value, a second sensor configured to measure the Hx and the Hz component values to output a sum (−Hx+Hz) of a negative X (−Hx) component value and the Hz component value, a third sensor configured to measure the Hy and the Hz component values to output a sum (Hy+Hz) of the Hy component value and the Hz component value, and a fourth sensor configured to measure the Hy and the Hz component values to output a sum (−Hy+Hz) of a negative Y (−Hy) component value and the Z component value (Hz).

The sensors may include a first, second, third and fourth sensor and the sensor controller may select the first, second, third and fourth sensor one by one in sequence during a predetermined period to be controlled, in order, to output the calculated component value at the corresponding sensor in sequence.

The sensor controller may select the sensors according to an order of the first, third, fourth and second sensor, according to an order of the first, fourth, third and second sensor, according to an order of the second, third, fourth and first sensor, according to an order of the second, fourth, third and first sensor, according to an order of the third, first, second and fourth sensor, according to an order of the third, second, first and fourth sensor, according to an order of the fourth, first, second and third sensor or according to an order of the fourth, second, first and third sensor.

The signal processor may use the following equations to calculate X, Y, or Z component values of the magnetic field, wherein the equations are X component value=(Hx+Hz)−(−Hx+Hz), Y component value=(Hy+Hz)−(−Hy+Hz), and Z component value=(Hx+Hz)+(−Hx+Hz)+(Hy+Hz)+(−Hy+Hz).

The sensors may include at least two sensors, the sensor controller may select only one sensor from among the at least two sensors, the selected sensor may operate to measure a physical quantity, and the physical quantity may be inputted into the amplifier.

A resting sensor that is not selected from among the at least two sensors may not operate.

The A/D transformer may use only one sensor from among the sensors for outputting an ADC data signal.

The signal processor may calculate component values for two axes with decreased noise and the signal processor may calculate component values for one axis with increased noise.

In another general aspect, a physical quantity measuring method includes measuring, using sensors of a signal measurer, component values of two axes from among component values of three axes including X(Hx), Y(Hy) and Z(Hz) measured component values of a physical quantity to be measured, outputting, using a sensor controller, a selected one from among the sensors to be controlled to output a measured value by the selected sensor, transforming, using an A/D transformer, an outputted signal selected by the sensor controller into a digital signal, and calculating, using a signal processor that receives the digital signal from the A/D transformer and combines the received digital signal with other received digital signals, X, Y, and Z axis component values of the magnetic field.

The measuring may include measuring the Hx and the Hz component values to output a sum (Hx+Hz) of the Hx component value and the Hz component value by a first sensor, measuring the Hx and the Hz component values to output a sum (−Hx+Hz) of a negative X (−Hx) component value and the Hz component value by a second sensor, measuring the Hy and the Hz component values to output a sum (Hy+Hz) of the Hy component value and the Hz component value by a third sensor, measuring the Hy and the Hz component values to output a sum (−Hy+Hz) of a negative Y (−Hy) component value and the Z component value (Hz) by a fourth sensor.

The outputting may include selecting one sensor from among the sensors one by one, in sequence, during a predetermined period to be controlled, in order, to output the calculated component value at the corresponding sensor.

The calculating may include using the following equations to calculate X, Y, or Z component values of the magnetic field, wherein the equations are X component value=(Hx+Hz)−(−Hx+Hz), Y component value=(Hy+Hz)−(−Hy+Hz), and Z component value=(Hx+Hz)+(−Hx+Hz)+(Hy+Hz)+(−Hy+Hz).

The sensors may include at least two sensors, the sensor controller may selects only one sensor from among the at least two sensors, the selected sensor may operate to measure a physical quantity, and the physical quantity may be inputted into the amplifier.

A resting sensor that is not selected among the at least two sensors may not operate.

The A/D transformer may use only one sensor from among the sensors for outputting one ADC data signal.

The calculating may include calculating component values for two axes with decreased noise and the calculating including calculating component values for one axis with increased noise Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
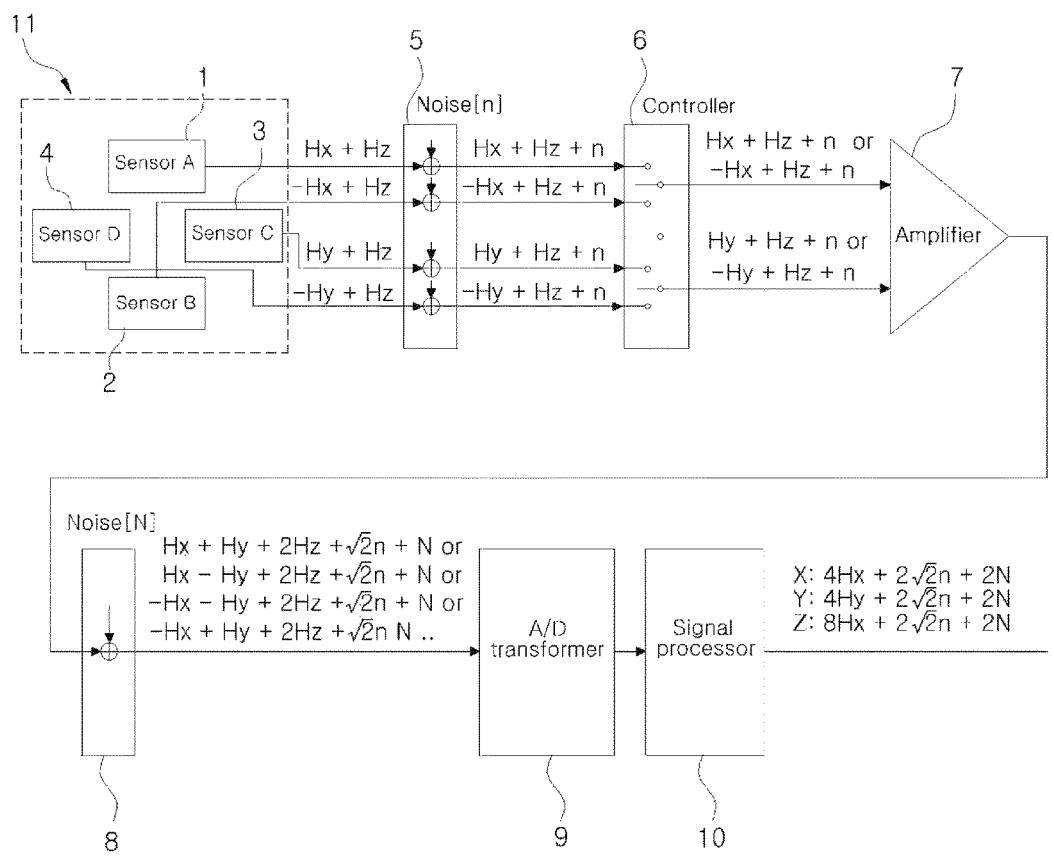
FIG. 1 is a block diagram illustrating a physical quantity measuring apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

While terms such as "first," "second," and the like, are possibly used to describe various components, such components are not to be understood as being limited to the terms. The terms are merely used to help the reader to distinguish one component from another.

It is to be understood that when an element is referred to as being "connected to" or "connected with" another element, the element is possibly directly connected to the other element or intervening elements are also possibly present. In contrast, when an element is referred to as being "directly connected to" another element, no intervening elements are intended to be present, except where the context makes it clear that other intervening elements are optionally present. In addition, unless explicitly described to the contrary, the word "comprise" and variations such as "comprises" or "comprising," or synonyms such as "including" or "having," are to be understood to imply the inclusion of stated elements, but not the exclusion of any other elements. Meanwhile, other expressions describing relationships between components such as "between", "immediately between" or "adjacent to" and "directly adjacent to" are to be construed similarly.

Singular forms "a", "an" and "the" in the present disclosure are intended to include the plural forms as well, unless the context clearly indicates otherwise.

Devices that are in communication with each other need not be in continuous communication with each other, unless expressly specified otherwise. In addition, devices that are in communication with each other possibly communicate directly or possibly communicate indirectly through one or more intermediaries.

Although process steps, method steps, algorithms, or the like, are described in a sequential order, such processes, methods and algorithms are also optionally configured to work in alternate orders. In other words, any sequence or order of steps that is described does not necessarily indicate a requirement that the steps be performed in that order. The steps of the processes, methods or algorithms described herein are to be performed in any order practical. Further, some steps are possibly performed simultaneously.

When a single device or article is described herein, it is to be readily apparent that more than one device or article is optionally used in place of a single device or article. Similarly, where more than one device or article is described herein, it is to be readily apparent that a single device or article is optionally used in place of the more than one device or article. The functionality or the features of a device are alternatively embodied by one or more other devices which are not explicitly described as having such functionality or features.

FIG. 1 is a reference block diagram illustrating a first physical quantity measuring apparatus 50.

Referring to the example of FIG. 1, the first physical quantity measuring apparatus 50 includes a plurality of sensor elements or sensors. The apparatus converts a physical quantity, such as a magnetic field, or an acceleration, into an electric signal by using a signal measuring unit or signal measurer 11 including sensors 1-4, a sensor control unit or sensor controller 6, an amplifying unit or amplifier 7, an A/D transforming unit or A/D transformer 9, and a signal processing unit or signal processor 10.

The sensors 1-4 include first sensor A 1, second sensor B 2, third sensor C 3, and fourth sensor D 4. The first sensor A 1 generates Hx+Hz. The second sensor B 2 produces −Hx+Hz and the third sensor C 3 generates Hy+Hz. The fourth sensor D 4 generates −Hy+Hz. Each sensor measures the magnetic field strength Hx, Hy, Hz by using a Hall sensor or an electronic compass or e-compass.

Hx corresponds to X-axis component of the measured magnetic field strength or acceleration. In the same way, Hy and Hz correspond to Y-axis and Z-axis components of the measured magnetic field respectively, such as strength or acceleration. Herein, a magnetic field strength corresponds to a magnitude of magnetic field. For example, Hx, Hy and Hz are measured in volts.

The first physical quantity measuring apparatus 50 finally produces these three-axis signals through the signal processor 10 in accordance with the following equations 1 and 2.

$$R1 \text{ output value selecting } A-C=Hx+Hy+2Hz+\text{SQRT}(2) \times n+N,$$

$$R2 \text{ output value selecting } A-D=Hx-Hy+2Hz+\text{SQRT}(2) \times n+N,$$

$$R3 \text{ output value selecting } B-D=-Hx-Hy+2Hz+\text{SQRT}(2) \times n+N,$$

$$R4 \text{ output value selecting } B-C=-Hx+Hy+2Hz+\text{SQRT}(2) \times n+N, \quad \text{Equation 1}$$

$$X\text{-axis output value}=4Hx+2\text{SQRT}(2) \times n+2N,$$

$$Y\text{-axis output value}=4Hy+2\text{SQRT}(2) \times n+2N,$$

$$Z\text{-axis output value}=8Hz+2\text{SQRT}(2) \times n+2N, \quad \text{Equation 2}$$

In these equations, the variable n corresponds to a noise generated from the signal measurer 11 and N corresponds to a noise generated from the amplifier 9. Each axis output value has a same noise level $2\text{SQRT}(2) \times n+2N$.

Figure 3:
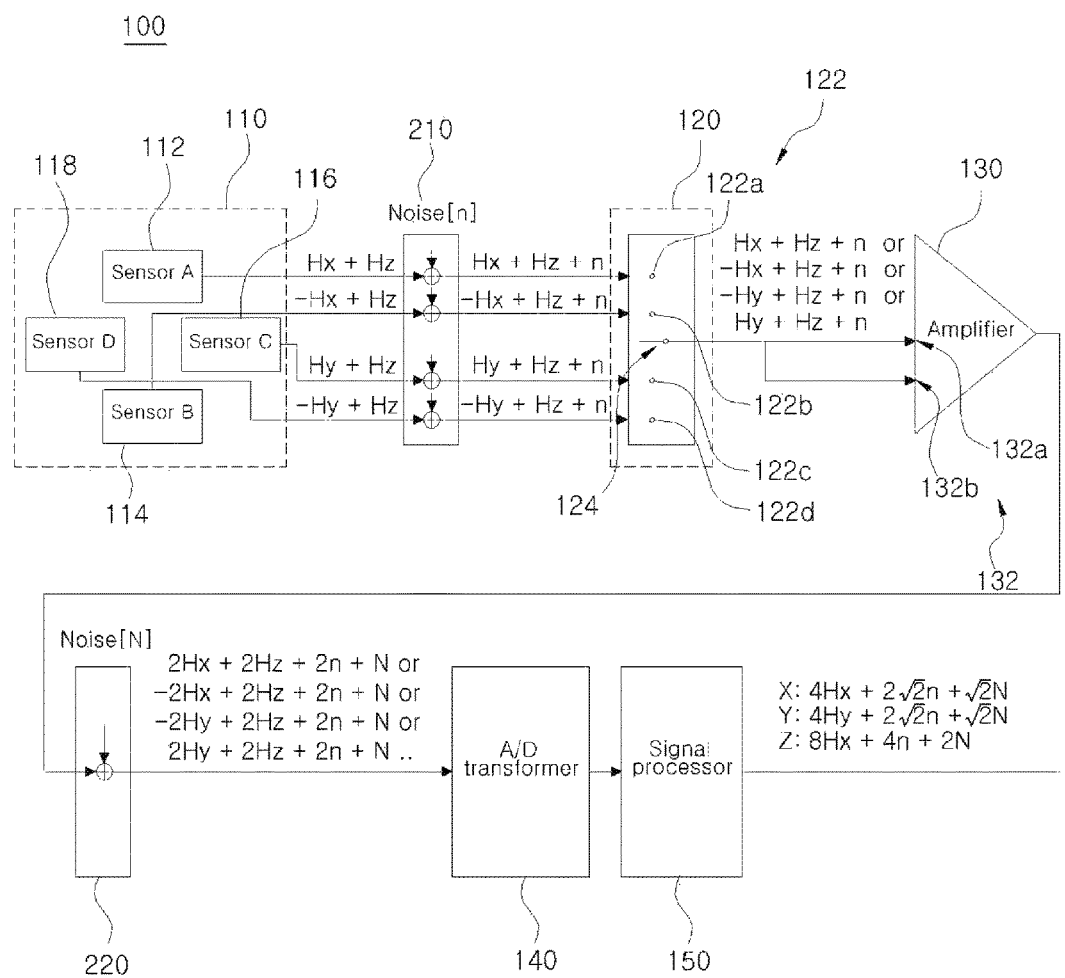
FIG. 3 is a block diagram illustrating a physical quantity measuring apparatus according to an embodiment.

However, the following second physical quantity measuring apparatus 100 as shown in FIG. 3 reduces the noise level, especially for the reduction of the noise generated from the amplifier. The details are discussed in FIG. 3.

Figure 2:
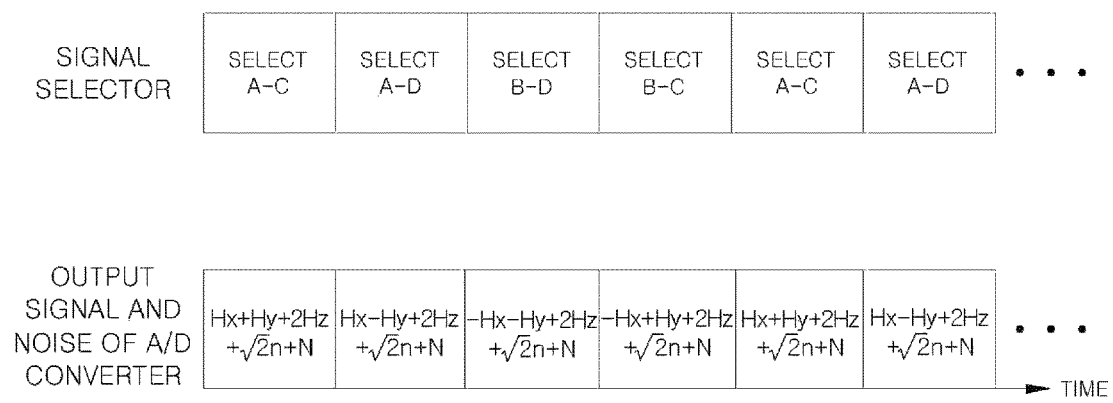
FIG. 2 is a timing chart illustrating a signal and noise component according to a sensor element selecting method in the example of FIG. 1.

FIG. 2 is a reference timing chart illustrating a signal and noise component according to a sensor element selecting method in FIG. 1. The example of FIG. 2 shows an example that is effective to decrease noise. However this example has a drawback in that it spends a large amount of current because a controller selects two sensors from among 4 sensors. When two sensors are selected simultaneously, current or power consumption increases, because current is supplied to both of the two elements. Referring to the example of FIG. 2, the A/D transformer 9 includes all component values of Hx, Hy and Hz of three axes of a physical quantity, as discussed further above.

FIG. 3 is a block diagram illustrating second physical quantity measuring apparatus 100 according to an embodiment. Referring to the example of FIG. 3, the second physical quantity measuring apparatus 100 includes a signal measurer 110, a sensor controller 120, an amplifier 130, an A/D transformer 140 and a signal processor 150.

A signal measurer 110 includes a plurality of sensors 112, 114, 116 and 118. For example, there are sensors A, B, C and D. Each sensor includes a Hall sensor or electronic e-compass. Each sensor measures a physical quantity, such as magnetic field strength or acceleration. The first sensor A 112 measures Hx and Hz. The second sensor B 114 measures Hx and Hz, a third sensor C 116 measures a Hy and Hz and a fourth sensor D 118 measures Hy and Hz.

A sensor noise [n] 210 is added to all the physical quantities measured by the plurality of sensors 112, 114, 116 and 118. Furthermore, amplifier noise [N] 220 is also added to all of the physical quantities.

A sensor controller 120 in the example of FIG. 3 selects one of the measured signals from the signal measurer 110. In one embodiment, a sensor controller 120 selects Hx+Hz+n generated from the first sensor A 112. If the second sensor B 114 is selected, −Hx+Hz+n is transferred to amplifier 130.

The sensor controller 120 selects each sensor one by one in sequence during a predetermined period. In another embodiment, the sensor controller 120 selects the plurality of sensors according to an order of the first, third, fourth and second sensor. Or, alternatively, the sensor controller selects the plurality of sensors according to an order of the first, fourth, third and second sensor.

A sensor controller 120 selects one among a plurality of sensors 112, 114, 116 and 118 to operate in an ON state. Since non-selected sensors remain in an OFF state, therefore there is no additional current to be supplied to the signal measurer 110. Hence, the present embodiments minimize required current consumption in the signal measurer 110.

For example, when a first sensor A 112 is selected to measure a magnetic field or an acceleration, other sensors including a second sensor B 114, a third sensor C 116 and a fourth sensor D 118 are set to be in an OFF state. The selected first sensor A 112 performs measurement of a physical quantity, in this example magnetic field strength, and the measured value is entered as input into an amplifier 130.

Similarly, when a second sensor B 114 operates, the rest of the sensors 112, 116, 118 except for the second sensor B 114 may be OFF state. In conclusion, the embodiments potentially decrease current consumption by using a method of selecting one sensor element at a time. Such a decrease of current consumption then decreases a power consumption of measuring apparatus. Because FIG. 2 uses a method that selecting at least two sensors at a time from among a plurality of sensors, FIG. 2 has drawback that it consumes at least twice as much current in comparison with the FIG. 3.

The sensor controller 120 sends the same signals to both first input terminal 122a and the second input terminal 122b. An amplifier 130 amplifies receives an output signal generated by the sensor controller 120. The amplifier 130 includes an amplifier input terminal 132. An amplifier input terminal 132 includes a first input terminal 132a and a second input terminal 132b.

Herein, an amplifier 130 performs a function for summing a signal inputted into the first input terminal 132a and the second input terminal 132b. The signals inputted into the first input terminal 132a and the second input terminal 132b have the same value. Because the inputted signals have an identical value, an inputted signal is amplified to have an output value that is doubled.

FIG. 3 does not include all component values of Hx, Hy and Hz for three axes of a physical quantity but instead includes Hx and Hz, or Hy and Hz. That is, each physical quantity of the present embodiments includes components for two axes. In an embodiment, an output value in the amplifier 130 includes a sensor noise [n] 210. that is measuring noise of a sensor. In addition to [n], the amplifier 130 generates an amplifier noise [N] 220.

The A/D transformer 140 transforms the output signal of the sensor controller 120 into a digital signal. For example, the A/D transformer 140 transforms an analog output measured by a plurality of sensors 112, 114, 116 and 118 in the signal measurer 110 into the digital output. To generate one ADC data output signal, one of the plurality of sensors is selected. Herein, the digital output of an A/D transformer 140 includes a sensor noise [n] 210 of a plurality of sensors 112,114,116 and 118 and an amplifier noise [N] 220.

A signal processor 150 receives a digital signal from the A/D transformer 140 and it produces X, Y and Z component values by combining values from among the digital signals. For example, in one embodiment, the signal processor 150 uses Equation 3 to produce X, Y and Z component values.

$$X \text{ component value} = (Hx+Hz)-(-Hx+Hz)$$

$$Y \text{ component value} = (Hy+Hz)-(-Hy+Hz)$$

$$Z \text{ component value} = (Hx+Hz)+(-Hx+Hz)+(Hy+Hz)+(-Hy+Hz) \quad \text{Equation 3}$$

The present embodiments use a method involving selecting only one sensor in a sensor controller to reduce the noise level, thereby increasing the signal-to-noise ratio (SNR). In addition, the second physical quantity measuring apparatus of the present embodiments potentially reduce current consumption. For example, it is required that the apparatus should supply a current to one sensor to allow the sensor to measure the physical quantity. That is, because the present embodiments use one sensor element, the current supplied for a sensor is halved in comparison with that supplied in FIG. 2.

Figure 4:
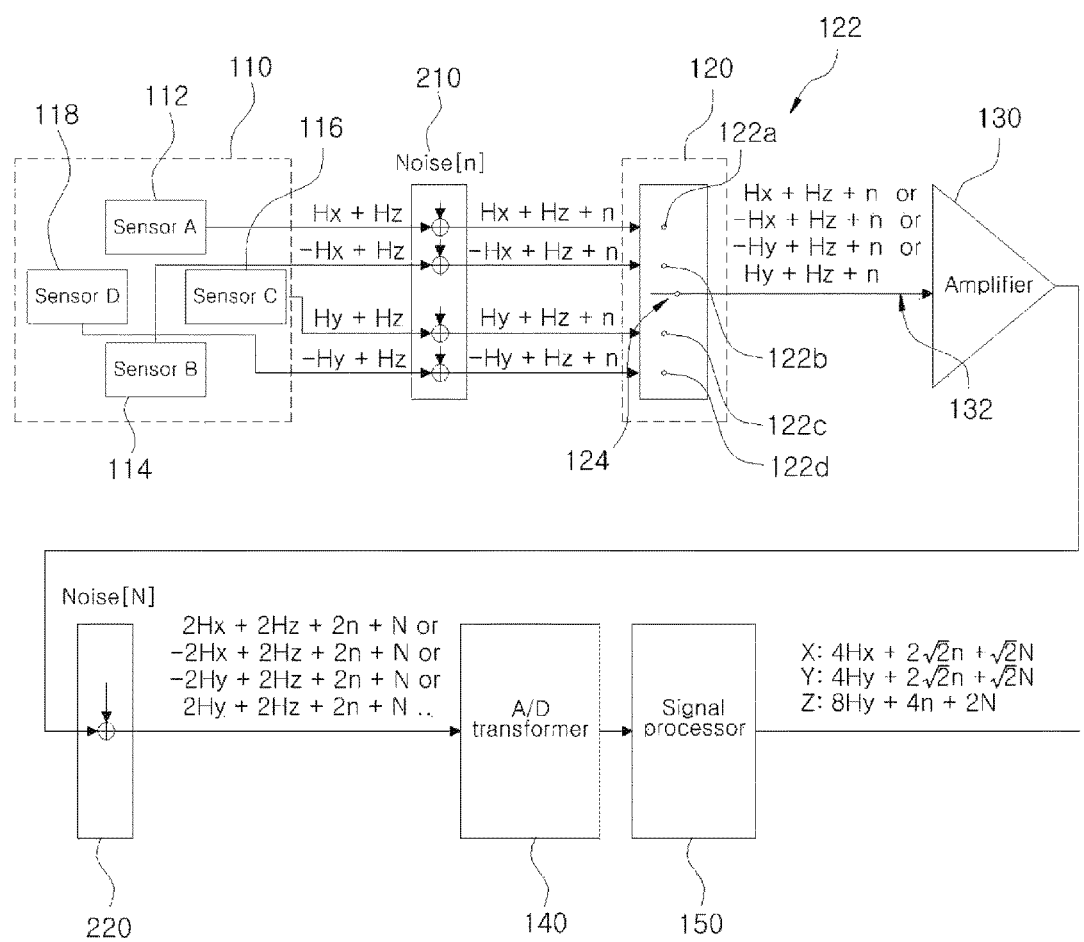
FIG. 4 is a block diagram illustrating a physical quantity measuring apparatus according to another embodiment.

FIG. 4 is a block diagram illustrating a third physical quantity measuring apparatus according to another embodiment.

Referring to the example of FIG. 4, the third amplifier 130 includes one amplifier input terminal 132 that receives an output of a sensor controller 120. By using this design, the amplifier 130 has a simple structure and outputs an amplified signal corresponding to a same level of a physical quantity measuring apparatus in FIG. 3 by controlling a gain of an amplifier 130.

Figure 5:
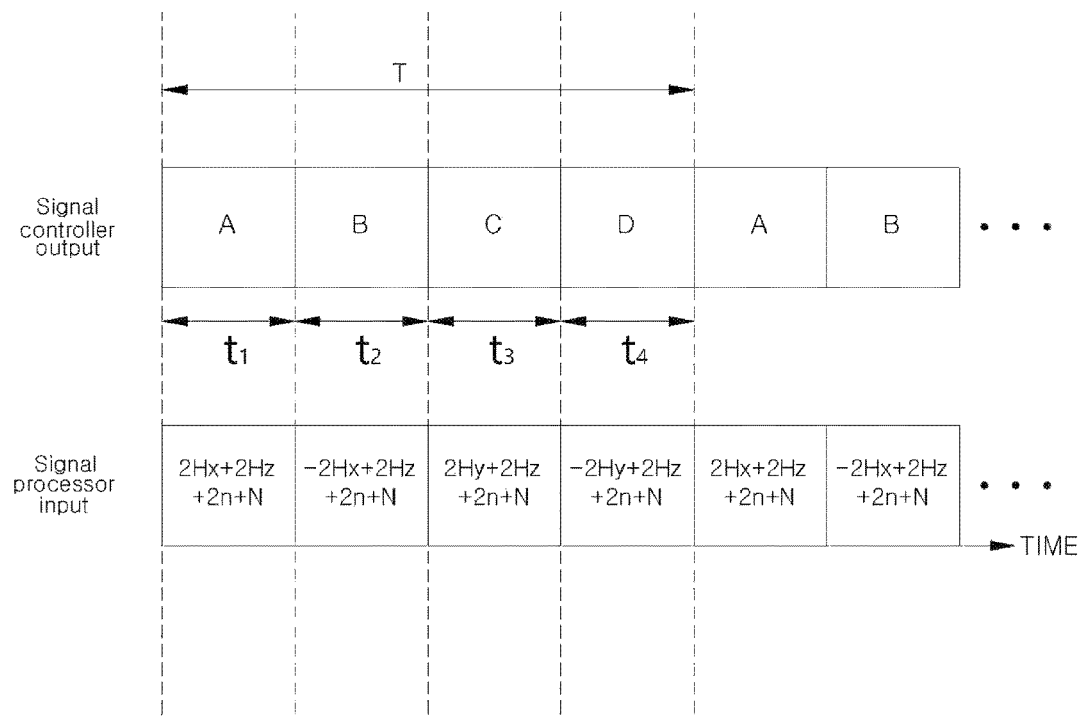
FIG. 5 is a schematic diagram showing an output of a sensor controller and an input of a signal processor according to time in the embodiments of FIG. 3 or 4.

FIG. 5 is a schematic diagram showing an output of a sensor controller and an input of a signal processor according to time in the examples of FIG. 3 or 4.

Referring to FIG. 5, a sensor controller 120 selects a first sensor A 112 at time t1, a second sensor B 114 at time t2, a third sensor C 116 at time t3 and a fourth sensor D 118 at time t4 during a predetermined period T and a signal processor 150 receives another signal according to the selected sensor of the sensor controller 120.

More specifically, at time t1 the sensor controller 120 selects the first sensor A 112 to output a signal value Hx+Hz+n including a noise n 210 of the first sensor A 112. The amplifier 130 amplifies the outputted signal value Hx+Hz+n up to 2×(Hx+Hz+n) and provides an amplifier noise N 220 to output signal value of 2Hx+2Hz+2n+N. The A/D transformer 140 receives a signal value of 2Hx+2Hz+2n+N from the amplifier 130 to transform a digital signal. Finally, the signal processor 150 receives a value of 2Hx+2Hz+2n+N that is transformed into a digital signal.

At time t2, the sensor controller 120 selects the second sensor B 114 to output a signal value −Hx+Hz+n including a noise n 210 of a second sensor 114. The amplifier 130 amplifies an outputted signal value −Hx+Hz+n up to 2×(−Hx+Hz+n) and provides an amplifier noise N 220 to output a signal value of −2Hx+2Hz+2n+N. For example, A/D transformed 140 receives a signal value −2Hx+2Hz+2n+N from an amplifier 130 to transform a digital signal. Lastly, a signal processor 150 receives a value of −2Hx+2Hz+2n+N transformed into a digital signal.

At time t3, the sensor controller 120 selects the third sensor C 116 to output a signal value of Hy+Hz+n including a noise n 210 of the third sensor C 116. The amplifier 130 amplifies an outputted signal value of Hy+Hz+n up to 2×(Hy+Hz+n) and provides an amplifier noise N 220 to output a value of 2Hy+2Hz+2n+N. The A/D transformer 140 receives a signal value of 2Hy+2Hz+2n+N from the amplifier 130 to transform a digital signal. Lastly, a signal processor 150 receives a value of 2Hy+2Hz+2n+N that has been transformed into a digital signal.

At time t4, the sensor controller 120 selects a fourth sensor D 118 to output a signal value of −Hy+Hz+n including a noise n 210 of the fourth sensor D 118. An amplifier 130 amplifies an outputted signal value −Hy+Hz+n up to 2×(−Hy+Hz+n) and provides an amplifier noise N 220 to output a value of −2Hy+2Hz+2n+N. The A/D transformer 140 receives a signal value −2Hy+2Hz+2n+N from the amplifier 130 to transform a digital signal. Lastly, a signal processor 150 receives a value of −2Hy+2Hz+2n+N transformed into a digital signal. This calculation sequence is summarized by the following Equation 4.

$$A \text{ signal processing input } A \text{ at } t1 = 2Hx+2Hz+2n+N$$

$$A \text{ signal processing input } B \text{ at } t2 = -2Hx+2Hz+2n+N$$

$$A \text{ signal processing input } C \text{ at } t3 = 2Hy+2Hz+2n+N$$

$$A \text{ signal processing input } D \text{ at } t4 = -2Hy+2Hz+2n+N \quad \text{Equation 4}$$

Thus, a signal processor 150 calculates values 2Hx+2Hz+2n+N, −2Hx+2Hz+2n+N, 2Hy+2Hz+2n+N and −2Hy+2Hz+2n+N that are transformed into digital signals to compute X, Y and Z component values of a physical quantity. The calculations are summarized as the following Equation 5.

$$X\text{-axis output value} = A-B = 4Hx+2\text{SQRT}(2)\times n+\text{SQRT}(2)\times N,$$

$$Y\text{-axis output value} = C-D = 4Hy+2\text{SQRT}(2)\times n+\text{SQRT}(2)\times N,$$

$$Z\text{-axis output value} = A+B+C+D = 8Hz+4n+2N, \quad \text{Equation 5}$$

In Equation 5, the n corresponds to a sensor noise generated from the signal measurer 110 and N corresponds to an amplifier noise generated from the amplifier 130.

Thus, total amplifier noise N in the X-axis and Y-axis output values is reduced to SQRT(2)×N compared from 2SQRT(2)×N shown in the FIG. 1. The total amplifier noise N in the Z-axis is 2N, which is a same level with first physical quantity measuring apparatus shown in the FIG. 1.

Figure 6:
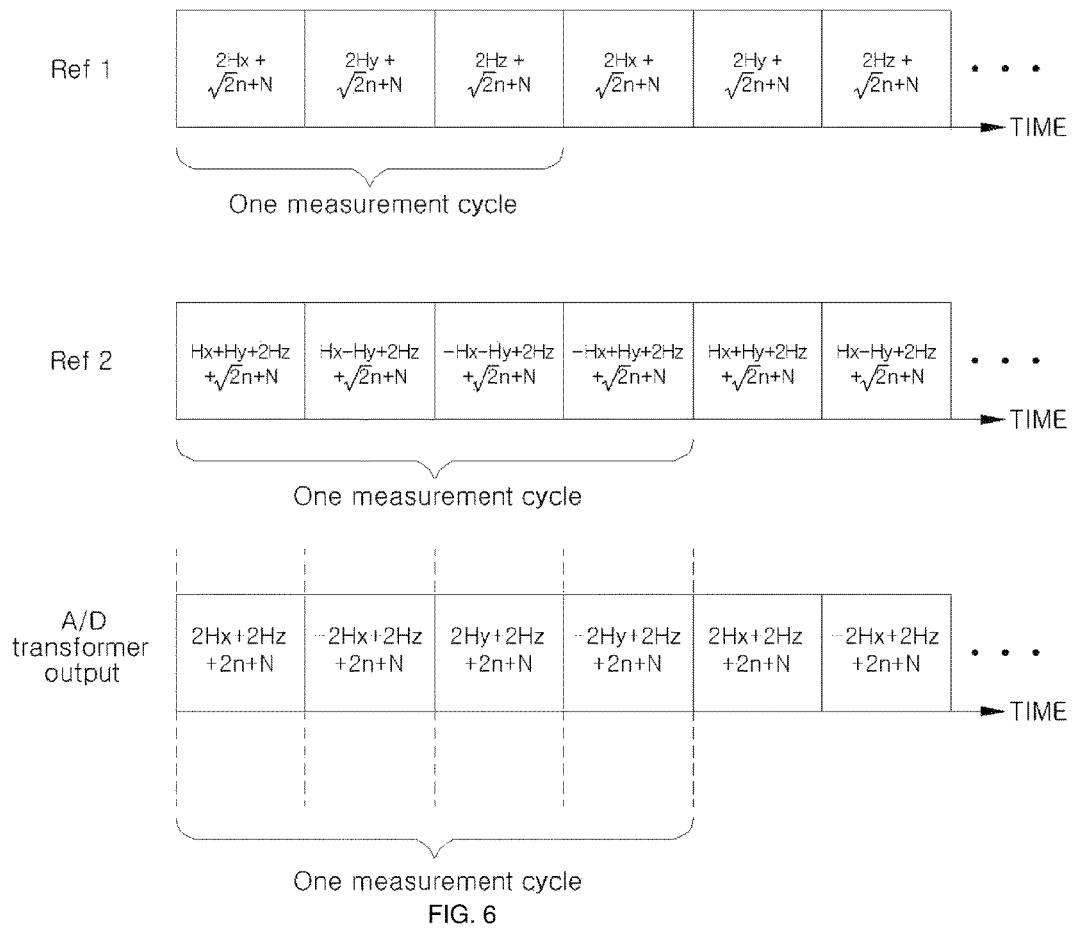
FIG. 6 is a schematic diagram showing a difference between a physical quantity measuring apparatus and an output of an A/D transformer of an alternative technology according to an embodiment.

FIG. 6 is a schematic diagram showing a difference between a physical quantity measuring apparatus and an output of an A/D transformer of an alternative technology, according to an embodiment.

In FIG. 6, Ref 1 illustrates an A/D transformer output according to time of an alternative technology. In the example of Ref 1, three different signals are outputted by an A/D transformer during one measurement cycle. Three signals outputted at an A/D transformer each include one component from among Hx, Hy and Hz. Namely, each of these three signals outputted at an A/D transformer includes only Hx, only Hy, or only Hz.

In a case of a Ref 2, four different signals are outputted by an A/D transformer during one measurement cycle. Four signals outputted at an A/D transformer each include aspects based on all components from among Hx, Hy and Hz.

In an embodiment, four different signals are outputted by an A/D transformer during one measurement cycle as Ref 2. However, the four different signals outputted at an A/D transformer do not include all components of a physical quantity, Hx, Hy and Hz, in comparison with Ref 2. Namely, four different signals outputted at an A/D transformer each include Hx and Hz or Hy and Hz. Embodiments operate in this manner because embodiments use one sensor at a time when a signal is measured.

X-axis and Y-axis output values as per Equation 5 of a physical quantity calculated through the embodiments are potentially rearranged as per the following Equation 6.

$$X\text{-axis output value}=4Hx+2\text{SQRT}(2)\times(1/a+\tfrac{1}{2})\times N$$

$$Y\text{-axis output value}=4Hy+2\text{SQRT}(2)\times(1/a+\tfrac{1}{2})\times N$$

$$Z\text{-axis output value}=8Hz+2(2/a+1)N \qquad \text{Equation 6}$$

Herein, "a" refers to a constant that corresponds to value derived by dividing an amplifier noise N 220 into a sensor noise n 210.

Table 1 presents a comparison between Hx, Hy, Hz noise of an alternative technology and Hx, Hy, Hz noise of the present embodiments. A noise corresponding to an alternative technology is possibly referred to as a value obtained by Equation 2, presented above, outputted through a signal processor 10 of FIG. 1. A noise that corresponds to the present embodiments is obtained by the use of Equation 5.

Table 1: Comparison Between Alternative Technology and Hx, Hy, Hz noise of the Present Embodiments

TABLE 1

Comparison Between Alternative Technology and Hx, Hy, Hz noise of the Present Embodiments

| Noise | Alternative Technology | The Present Embodiments |
|---|---|---|
| Hx noise | $2\sqrt{2}n + 2N$ | $2\sqrt{2}n + \sqrt{2}N$ |
| Hy noise | $2\sqrt{2}n + 2N$ | $2\sqrt{2}n + \sqrt{2}N$ |
| Hz noise | $2\sqrt{2}n + 2N$ | $4n + 2N$ |

Referring to Table 1, it is known that the present embodiments possibly decrease a noise of Hx, Hy component. That is, a noise of Hx and Hy decrease from $2\sqrt{2}n+2N$ to $2\sqrt{2}n+\sqrt{2}N$. Also, an amplifying noise N decreases from 2N to $\sqrt{2}N$. A noise from sensor measurement is not changed. However, a noise by an amplifier decreases. However, a noise of an Hz component increases from $2\sqrt{2}n+2N$ to $4n+2N$.

Also, a range of SNR fluctuation of the present embodiments in comparison with a range of SNR fluctuation from an alternative reference technology is defined by the following Equation 7.

$A$ range of SNR fluctuation of $X$ component value (%)=$X$ component value of alternative technology/$X$ component of the present embodiments*100

$A$ range of SNR fluctuation of $Y$ component value (%)=$Y$ component value of alternative technology/$Y$ component of the present embodiments*100

$A$ range of SNR fluctuation of $Z$ component value (%)=$Z$ component value of alternative technology/$Z$ component of the present embodiments*100 \qquad Equation 7

A range of SNR fluctuation of the X component value (%), a range of SNR fluctuation of the Y component value (%) and a range of SNR fluctuation of the Z component value (%) are computed by use of Equation 7. For example, a value obtained by dividing an amplifier noise N 220 into a sensor noise n 210, a range of SNR fluctuation of X component value (%) of a constant "a", a range of SNR fluctuation of Y component value (%) of a constant "a" and a range of SNR fluctuation of Z component value (%) of a constant "a" are illustrated in FIG. 7.

Figure 7:
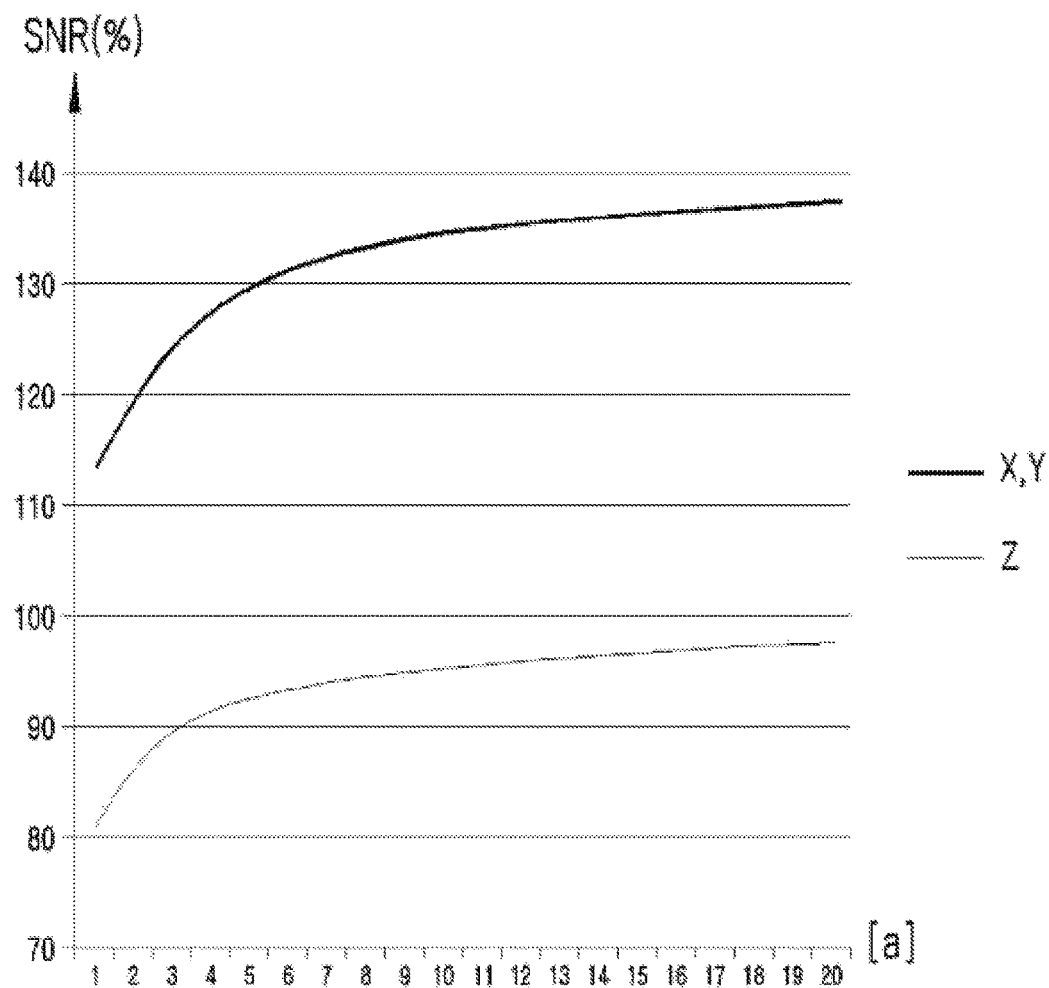
FIG. 7 is a graph illustrating a range of SNR fluctuation in comparison with reference technology of X and Y component values of a physical quantity measured according to an embodiment.

FIG. 7 is a graph illustrating a range of SNR fluctuation, in comparison with reference technologies, of X and Y component values of a physical quantity measured according to an embodiment. Herein, a physical quantity corresponds to a magnetic field or an acceleration.

Referring to the example of FIG. 7, a range of SNR fluctuation of a physical quantity X component value measured through the embodiments has a value over 100% regardless of the value "a" and converges upon 140% according to increasing "a". That is, the embodiments are effective at decreasing a noise of measured physical quantities of an X component value and a Y component value. An SNR of a final output is variable according to a ratio of noise produced by a sensor and noise produced by an amplifier and an SNR improves when a noise produce by an amplifier is more than a noise produced by a sensor. That is, an SNR improvement effectiveness of the embodiments is increased by providing a system in which a noise provided by a sensor decreases or a noise provided by an amplifier increases.

Figure 8:
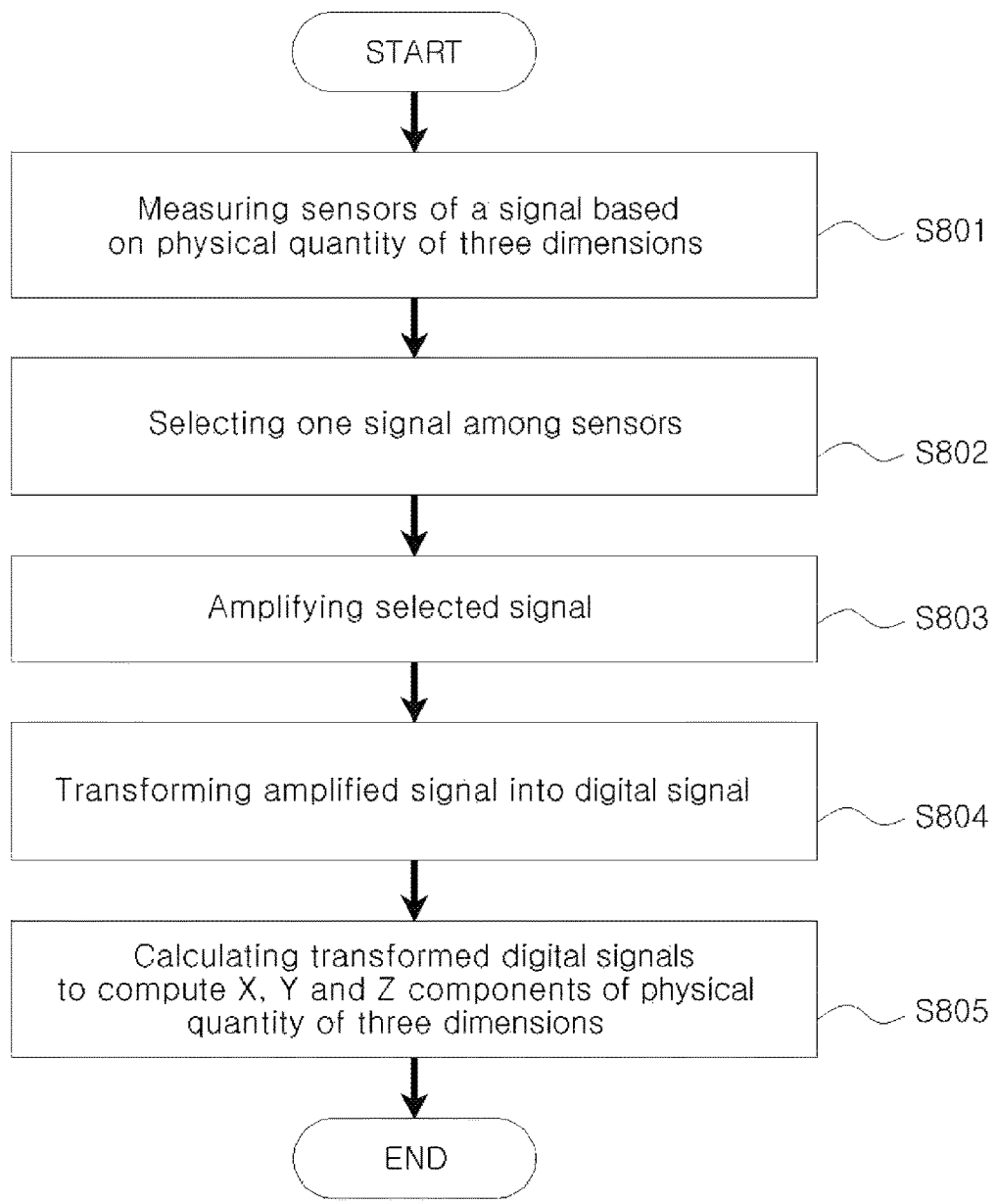
FIG. 8 is a flowchart showing a method of measuring a physical quantity according to an embodiment.

FIG. 8 is a flowchart showing a method of measuring a physical quantity according to an embodiment. Herein, a physical quantity corresponds to a magnetic field or an acceleration.

First, in operation S801 a plurality of sensors 112, 114, 116 and 118 of a signal measurer 110 measure component values of two axes among component values of three axes, including X(Hx), Y(Hy) and Z(Hz) component values of a physical quantity. Herein, a physical quantity corresponds to a magnetic field or an acceleration. In one embodiment, a first sensor A 112 measure the Hx and the Hz to output a sum Hx+Hz of the Hx and the Hz components, a second sensor B 114 measures the Hx and the Hz to output a sum −Hx+Hz of a negative X or −Hx component and the Hz, a third sensor C 116 measures the Hy and the Hz to output a sum Hy+Hz of the Hy and the Hz components and a fourth sensor D 118 measures the Hy and the Hz to output a sum −Hy+Hz of a negative Y or −Hy component and the Z component Hz.

Next, in operation S802, a sensor controller 120 selects a plurality of sensors 112, 114, 116 and 118 included in a signal measurer 110 one by one in sequence during a predetermined order. In one embodiment, a sensor controller 120 selects a first sensor 112, a second sensor 114, a third sensor 116 and a fourth sensor 118, one by one in sequence during a predetermined period to be controlled, in order to output the measured value at the corresponding sensor, in sequence. In one embodiment, a plurality of sensors 112, 114, 116 and 118 may include at least two or more sensors and a physical quantity measuring apparatus 100 selects only one sensor among the at least two or more sensors, operates the selected sensor and measure a physical quantity to input the measured physical quantity into the amplifier. In another embodiment, a resting sensor that is not selected among the at least two or more sensors does not operate.

In operation S803, an amplifier 130 receives a measured value at a sensor selected by a sensor controller 120 to amplify.

In operation S804, an A/D transformer 140 transforms an outputted and amplified signal selected by a sensor controller 120 into a digital signal. For example, an A/D transformer 140 uses only one sensor among a plurality of sensors 112, 114, 116 and 118 for outputting one ADC data signal.

In operation S805, a signal processor 150 receives a digital signal from an A/D transformer 140 and combines at least one more from among a plurality of received digital signals to calculate X, Y and Z component values of a physical quantity. In one embodiment, a signal processor 150 uses Equation 3 to calculate X, Y and Z component values of the physical quantity.

The apparatuses, units, modules, devices, and other components illustrated in FIGS. 1-8 that perform the operations described herein with respect to FIGS. 1-8 are implemented by hardware components. Examples of hardware components include controllers, transformers, measurers, amplifiers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described herein with respect to FIGS. 1-8 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A physical quantity measuring apparatus, comprising:
a signal measurer comprising sensors configured to measure component values of two axes from among component values of three axes comprising an X (Hx), a Y (Hy), and a Z (Hz) component value of a physical quantity;
a sensor controller configured to select a sensor from among the sensors to output a signal;
an A/D transformer configured to transform the outputted signal into a digital signal; and
a signal processor configured to
receive the digital signal from the ND transformer, and combine the received digital signal with other received digital signals to calculate the X component value of the physical quantity by an addition or subtraction operation in which Hz is canceled, calculate the Y component value of the physical quantity by an addition or subtraction operation in which Hz is canceled, and calculate the Z component value of the physical quantity by an addition or subtraction operation in which Hx is canceled and an addition or subtraction operation in which Hy is canceled.

2. The physical quantity measuring apparatus of claim 1, further comprising:
an amplifier configured to amplify the outputted signal, wherein each physical quantity outputted by the amplifier comprises only components for two axes.

3. The physical quantity measuring apparatus of claim 1, wherein the sensors comprise
a first sensor configured to measure Hx and Hz to output a sum (Hx+Hz),
a second sensor configured to measure Hx and Hz to output a sum (−Hx+Hz),
a third sensor configured to measure Hy and Hz to output a sum (Hy+Hz), and
a fourth sensor configured to measure Hy and Hz to output a sum (−Hy+Hz).

4. The physical quantity measuring apparatus of claim 1, wherein
the sensors comprise a first, second, third and fourth sensor, and
the sensor controller selects the first, second, third and fourth sensors one by one in sequence during a predetermined period, in order to output component values at a corresponding sensor in sequence.

5. The physical quantity measuring apparatus of claim 4, wherein the sensor controller is further configured to select the sensors according to an order of the first, third, fourth and second sensor, according to an order of the first, fourth, third and second sensor, according to an order of the second, third, fourth and first sensor, according to an order of the second, fourth, third and first sensor, according to an order of the third, first, second and fourth sensor, according to an order of the third, second, first and fourth sensor, according to an order of the fourth, first, second and third sensor, or according to an order of the fourth, second, first and third sensor.

6. The physical quantity measuring apparatus of claim 1, wherein the signal processor is further configured to calculate the X, Y, and Z component values of the physical quantity using the following equations:

$X$ component value$=(Hx+Hz)-(-Hx+Hz)$, $Y$ component value$=(Hy+Hz)-(-Hy+Hz)$, and $Z$ component value$=(Hx+Hz)+(-Hx+Hz)+(Hy+Hz)+(-Hy+Hz)$.

7. The physical quantity measuring apparatus of claim 1, wherein the sensors comprise at least two sensors, the sensor controller is further configured to select only one sensor from among the at least two sensors, the selected sensor operates to measure the physical quantity, and the physical quantity is inputted into the amplifier.

8. The physical quantity measuring apparatus of claim 7, wherein a resting sensor that is not selected from among the at least two sensors does not operate.

9. The physical quantity measuring apparatus of claim 1, wherein the ND transformer uses only one sensor from among the sensors for outputting an ADC data signal.

10. The physical quantity measuring apparatus of claim 1, wherein the signal processor is further configured to calculate component values for two axes with decreased noise and to calculate component values for one axis with increased noise.

11. The physical quantity measuring apparatus of claim 1, wherein the signal processor is further configured to produce a three-axis signal having as its component values the X component value, the Y component value, and the Z component value of the physical quantity.

12. A physical quantity measuring method, comprising:
measuring, using sensors of a signal measurer, component values of two axes from among component values of three axes including an X (Hx), a Y (Hy), and a Z (Hz) component value of a physical quantity;
outputting, by a sensor among the sensors that is selected by a sensor controller, a signal;
transforming, using an ND transformer, the outputted signal into a digital signal; and
calculating, using a signal processor that receives the digital signal from the ND transformer and combines the received digital signal with other received digital signals, the X, Y, and Z component values of the physical quantity,
wherein the X component value of the physical quantity is calculated by an addition or subtraction operation in which Hz is canceled, the Y component value of the physical quantity is calculated by an addition or subtraction operation in which Hz is canceled, and the Z component value of the physical quantity is calculated by an addition or subtraction operation in which Hx is canceled and an addition or subtraction operation in which Hy is canceled.

13. The physical quantity measuring method of claim 12, wherein the measuring comprises
measuring Hx and Hz to output a sum (Hx+Hz),
measuring Hx and Hz to output a sum (−Hx+Hz),
measuring Hy and Hz to output a sum (Hy+Hz), and
measuring Hy and Hz to output a sum (−Hy+Hz).

14. The physical quantity measuring method of claim 12, wherein the outputting comprises selecting a sensor from among the sensors one by one, in sequence, during a predetermined period, in order to output component values at a corresponding sensor.

15. The physical quantity measuring method of claim 12, wherein the calculating of the X, Y, and Z component values of the physical quantity comprises calculating the X, Y, and Z component values of the physical quantity using the following equations:

X component value=(Hx+Hz) (−Hx+Hz), Y component value=(Hy+Hz)−(−Hy+Hz), and

Z component value=(Hx+Hz)+(−Hx+Hz)+(Hy+Hz)+(−Hy+Hz).

16. The physical quantity measuring method of claim 12, wherein the sensors comprise at least two sensors, the sensor controller selects only one sensor from among the at least two sensors, the selected sensor operates to measure the physical quantity, and the physical quantity is inputted into the amplifier.

17. The plurality of sensors of claim 16, wherein a resting sensor that is not selected from among the at least two sensors does not operate.

18. The physical quantity measuring method of claim 12, wherein the ND transformer uses only one sensor from among the sensors to output an ADC data signal.

19. The physical quantity measuring apparatus of claim 12, wherein
the calculating comprises calculating component values for two axes with decreased noise, and calculating component values for one axis with increased noise.

20. The physical quantity measuring apparatus of claim 1, wherein
noise of the X component value of the physical quantity is equal to $2\sqrt{2}n+\sqrt{2}N$, noise of the Y component value of the physical quantity is equal to $2\sqrt{2}n+\sqrt{2}N$, noise of the Z component value of the physical quantity is equal to $4n+2N$, wherein n is noise generated by the signal measurer, and N is noise generated by the amplifier.

* * * * *